US008812560B2

(12) United States Patent
Mostafa et al.

(10) Patent No.: US 8,812,560 B2
(45) Date of Patent: *Aug. 19, 2014

(54) DYNAMICALLY SCALABLE MODES

(71) Applicant: International Business Machines Corporation, Armonk, NY (US)

(72) Inventors: Mohammed Mostafa, Kanata (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,291

(22) Filed: Feb. 28, 2013

(65) Prior Publication Data
US 2013/0179451 A1    Jul. 11, 2013

Related U.S. Application Data

(63) Continuation of application No. 13/168,537, filed on Jun. 24, 2011.

(51) Int. Cl.
G06F 17/30    (2006.01)

(52) U.S. Cl.
CPC .............................. G06F 17/30324 (2013.01)
USPC ......................................... 707/803; 707/745

(58) Field of Classification Search
CPC ............................................... G06F 17/30324
USPC ........... 707/745, 803, 765, 797; 715/771, 823
See application file for complete search history.

(56) References Cited

U.S. PATENT DOCUMENTS

| 6,600,494 | B1 | 7/2003 | Turaccio et al. | |
| 6,909,804 | B2 * | 6/2005 | Caruso et al. | 382/166 |
| 7,779,382 | B2 * | 8/2010 | Rehof et al. | 717/104 |
| 2006/0204086 | A1 | 9/2006 | Gargi | |
| 2009/0067733 | A1 | 3/2009 | Ballerini | |
| 2009/0292799 | A1 * | 11/2009 | Eisener et al. | 709/223 |
| 2010/0296112 | A1 | 11/2010 | Baumler et al. | |
| 2011/0208740 | A1 * | 8/2011 | Lynch | 707/737 |
| 2012/0327097 | A1 | 12/2012 | Mostafa et al. | |

OTHER PUBLICATIONS

Michael J. Gormish, "Compression of Palettized Images by Color," IEEE 1995, pp. 274-277.
Wenjun Zeng et al., "An Efficient Color Re-Indexing Scheme for Palette-Based Compression," IEEE 2000, 5 pages.

(Continued)

*Primary Examiner* — Shahid Alam
(74) *Attorney, Agent, or Firm* — Shumaker & Sieffert, P.A.

(57) ABSTRACT

The present disclosure includes techniques for storing indexed values that may increase computing performance. In one example, a method includes receiving a request to store an input value in a data structure. The method also includes determining the input value is not represented by an index value of the first group of index values, generating an index value that represents the input value, and determining the generated index value is not included in the first group of representations. The method also includes generating a second group of index values wherein a first size of index values of the first group is different than a second size of index values of the second group. The method also includes modifying a storage capacity of the data structure to store the index values of the second group of the second size and storing the second group of index values in the data structure.

9 Claims, 5 Drawing Sheets

(56) References Cited

OTHER PUBLICATIONS

Chin-Chen Chang et al., "A Dynamic Color Palette for Color Images Coding," http://www.springerlink.com/content/bxgpmmd6k5m75gax/ (2002) 1 page.

Office Action dated Oct. 9, 2013 in U.S. Appl. No. 13/168,537, 6 pgs.
Notice of Allowance from U.S. Appl. No. 13/168,537, dated Feb. 4, 2014, 8 pp.
Response filed Jan. 8, 2013 to the Office Action dated Oct. 9, 2013 in U.S. Appl. No. 13/168,537, 2 pgs.

* cited by examiner

DYNAMICALLY SCALABLE MODES

This application is a continuation of Ser. No. 13/168,537, filed on Jun. 24, 2011, entitled DYNAMICALLY SCALABLE MODES, the entire content of which is incorporated herein by reference.

TECHNICAL FIELD

The disclosure relates to memory management.

BACKGROUND

The size of an image may be proportional to the information density of the image. For example, increasing the quantity of pixels in an image or including more information per pixel may increase the size of an image. However, compression techniques are known that increase information density without increasing a stored image size. In some cases, images may be manipulated in memory where a block of memory is used to store the pixels of an image. The memory used to manipulate the image can be reduced using indexed colors where each pixel specifies an index in a palette of colors, rather than the color itself.

SUMMARY

In one example, a method includes receiving, by a computing device, a request to store an input value in a data structure, wherein the data structure stores one or more index values of a first group of index values, wherein the first group of index values uniquely represent storage values, wherein the one or more index values comprise a first group of representations of the storage values. The method also includes determining, by the computing device, that the input value is not represented by an existing index value of the first group of index values. The method further includes generating, by the computing device, an index value that represents the input value. The method also includes determining, by the computing device, that the generated index value is not included in the first group of representations. The method further includes, responsive to determining that the generated index value is not included in the first group of representations, generating, by the computing device, a second group of index values comprising a second group of representations that uniquely represent all of the storage values and the input value, wherein a first size of index values of the first group is different than a second size of index values of the second group; modifying, by the computing device, a storage capacity of the data structure to store the index values of the second group of the second size; and storing, by the computing device, the second group of index values in the data structure.

In one example a computing device includes: a computer readable storage medium; one or more processors; an input device to receive a request to store an input value in a data structure of the computer readable storage medium, wherein the data structure stores one or more index values of a first group of index values, wherein the first group of index values uniquely represent storage values, wherein the one or more index values comprise a first group of representations of the storage values; and a graphics module executable by the one or more processors to: determine that the input value is not represented by an existing index value of the first group of index values. The graphics module is further executable to generate an index value that represents the input value and determine that the generated index value is not included in the first group of representations. The graphics module is also executable to, responsive to determining that the generated index value is not included in the first group of representations, generate a second group of index values comprising a second group of representations that uniquely represent all of the storage values and the input value, wherein a first size of index values of the first group is different than a second size of index values of the second group; modify a storage capacity of the data structure to store the index values of the second group of the second size; and store the second group of index values in the data structure.

In one example, a computer program product for re-allocating index values, the computer program product comprising a computer-readable storage medium having computer-readable program code embodied therein. The computer-readable program product includes computer-readable program code to receive a request to store an input value in the computer readable memory, wherein the computer readable memory stores one or more index values of a first group of index values, wherein the first group of index values uniquely represent storage values, wherein the index values comprise a first group of representations of the storage values. The computer-readable program product also includes computer-readable program code to determine the input value is not represented by one of the index values. The computer-readable program product also includes computer-readable program code to generate an index value that represents the input value. The computer-readable program product also includes computer-readable program code to determine the generated index value is not included in the first group of representations. The computer-readable program product further includes computer-readable program code to generate, responsive to determining the generated index value is not included in the first group of representations, a second group of index values comprising a second group of representations that uniquely represent all the storage values and the input value, wherein a first size of index values of the first group is different than a second size of index values of the second group. The computer-readable program product also includes computer-readable program code to modify a storage capacity of the data structure to store the index values of the second group of the second size. The computer-readable program product also includes computer-readable program code to store the second group of index values in the computer readable memory.

The details of one or more embodiments of the invention are set forth in the accompanying drawings and the description below. Other features, objects, and advantages of the disclosure will be apparent from the description and drawings, and from the claims.

DETAILED DESCRIPTION

Figure 1:
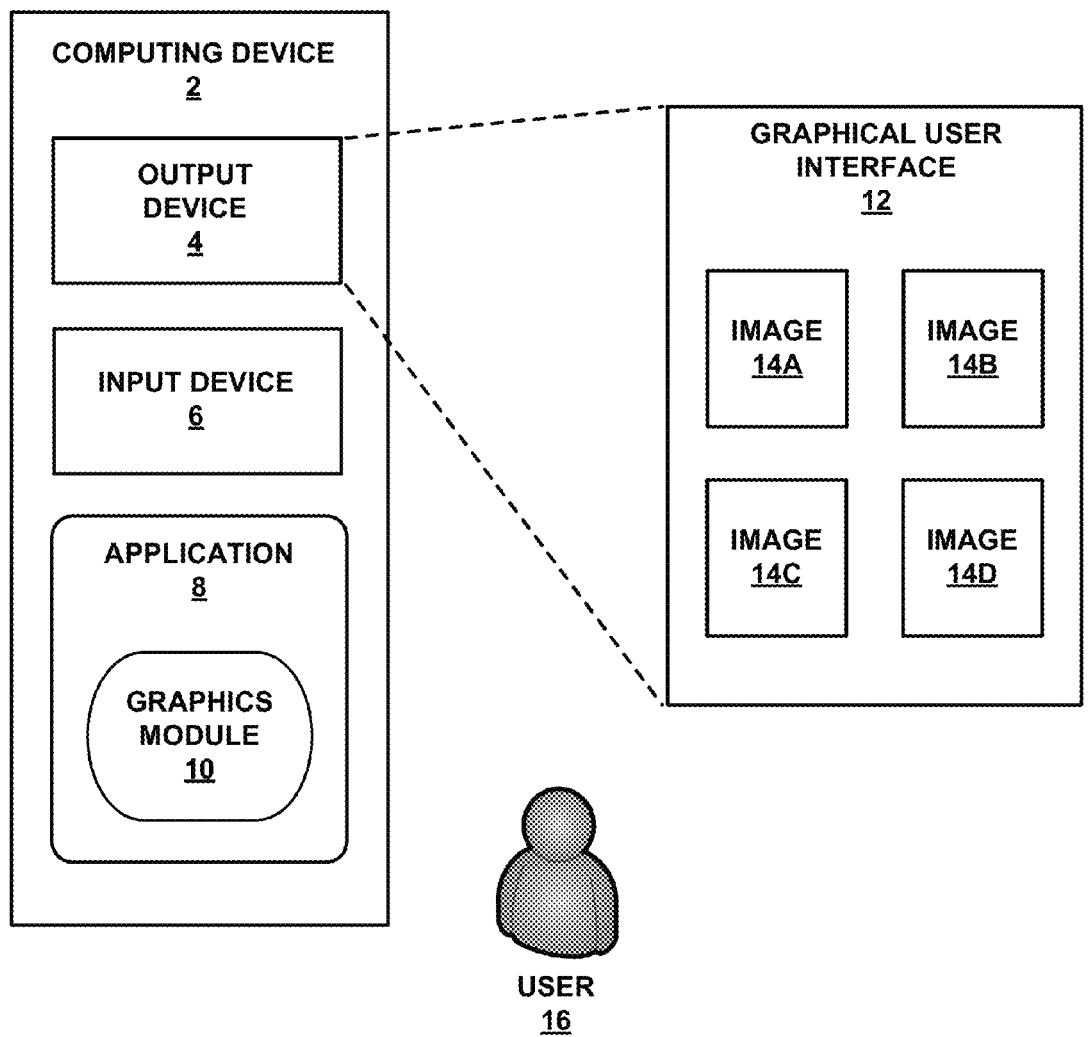
FIG. 1 is a block diagram illustrating an example of a computing device that may be configured to execute an application, in accordance with one or more aspects of the present disclosure.

In general, the present disclosure is directed to techniques for storing indexed values in a bitmap that may improve storage efficiency and, in some cases, increase computing performance. For example, images may be manipulated quickly and efficiently in memory using an image bitmap. In the image bitmap, a block of memory may be used to store an array of pixels that comprise the image. Memory used to represent the image may be reduced using index values such that each pixel is represented in the bitmap by an index value. The index value is further mapped to an actual color value in a palette of colors.

Techniques of the present disclosure may improve memory utilization by generating index values using only a fewest number of bits to uniquely represent each actual color value of pixels in the image. The index values may be generated using a fewest number of bits based on the number of uniquely identifiable colors stored in the image bitmap. The techniques further allow the size of index values to increase granularly as new colors are stored in the image. As the number of index values increase when new colors are stored in the image bitmap, techniques of the present disclosure may dynamically increase the size of the index values, reassign the index values to existing and newly-added colors, and further allocate additional memory to store the larger index values if needed. Thus, using techniques of the present disclosure, memory may be used efficiently by generating index values based on the number of uniquely identifiable colors used in an image bitmap and granularly increasing the size of index values as more colors are included in the image.

Images in memory may need to be manipulated quickly and efficiently. In some examples, a graphics library may provide a bitmap representation of an image. The bitmap representation may be stored in memory where a block of memory is used to store an array of pixel values. In a direct color mode, each pixel value in a bitmap comprises an actual color value (e.g., 32 bits). Memory use may be reduced by indexing color values to index values where each pixel specifies an index value in a palette of colors, rather than the color value itself. This approach may save memory when the index values may be less than 32 bits, e.g., 8 or 16 bits.

To determine whether direct or index mode will provide better performance, a programmer or other user of the graphics library may be required to know beforehand which of the two modes to use. For example, in the case of indexed colors, the programmer may be required to know what size of the index values to use. In some examples, a programmer may use a 32 bit bitmaps to allow 32 bit color depth in all cases even when not required. Because images, due to the pixel-based representations, may use substantial memory, the manipulation of a few images at once may cause a great number of memory page swaps to occur, or slow down garbage collection, heavily reducing performance of the system. Also, many new small devices can have limited memory or significant memory restrictions.

Techniques of the present disclosure analyze image contents at run time, and based on the contents, dynamically change the size of the image bitmap, which provides improved scalability and reduced memory foot prints that are based on the actual needs of the user/image. Thus, aspects of the disclosure may reduce memory needed to uniquely identify the color of each pixel in the palette and each color value in an image bitmap. Techniques described herein for accessing and manipulating each pixel in the bitmap may use the palette size, e.g., number of color values included in an image, to determine the number of bits of each index value and to update pixel values in the bitmap. In this way the pixel values may remain contiguous in memory for easy management, while memory use for each pixel may be reduced.

FIG. 1 is a block diagram illustrating an example of a computing device 2 that may be configured to execute an application 8 in accordance with one or more aspects of the present disclosure. FIG. 1 further includes a graphical user interface (GUI) 12 displayed by output device 4 in response to data received by output device 4 from application 8. GUI 12 further includes images 14A-D. As shown in FIG. 1, user 16 may interact with application 8 using input device 6. As described herein, application 8 may further include graphics module 10 that implements techniques of the present disclosure. Graphics module 10 may include or be a part of a graphics library.

Computing device 2, in some examples, includes or is a part of a portable computing device (e.g. mobile phone/netbook/laptop/tablet device) or a desktop computer. Computing device 2 may also connect to a network including a wired or wireless network using a network device. Computing device 2 may also include output device 4 as further described in FIG. 2. In some examples, output device 4 may be programmed by computing device 2 to display graphical content. Graphical content, generally, includes any visual depiction displayed by presence-sensitive screen 4. Examples of graphical content may include images 14A-14D, videos, visual objects and/or visual program components such as scroll bars, text boxes, buttons, etc. In one example, application 8 may cause output device 4 to display GUI 12.

Figure 2:
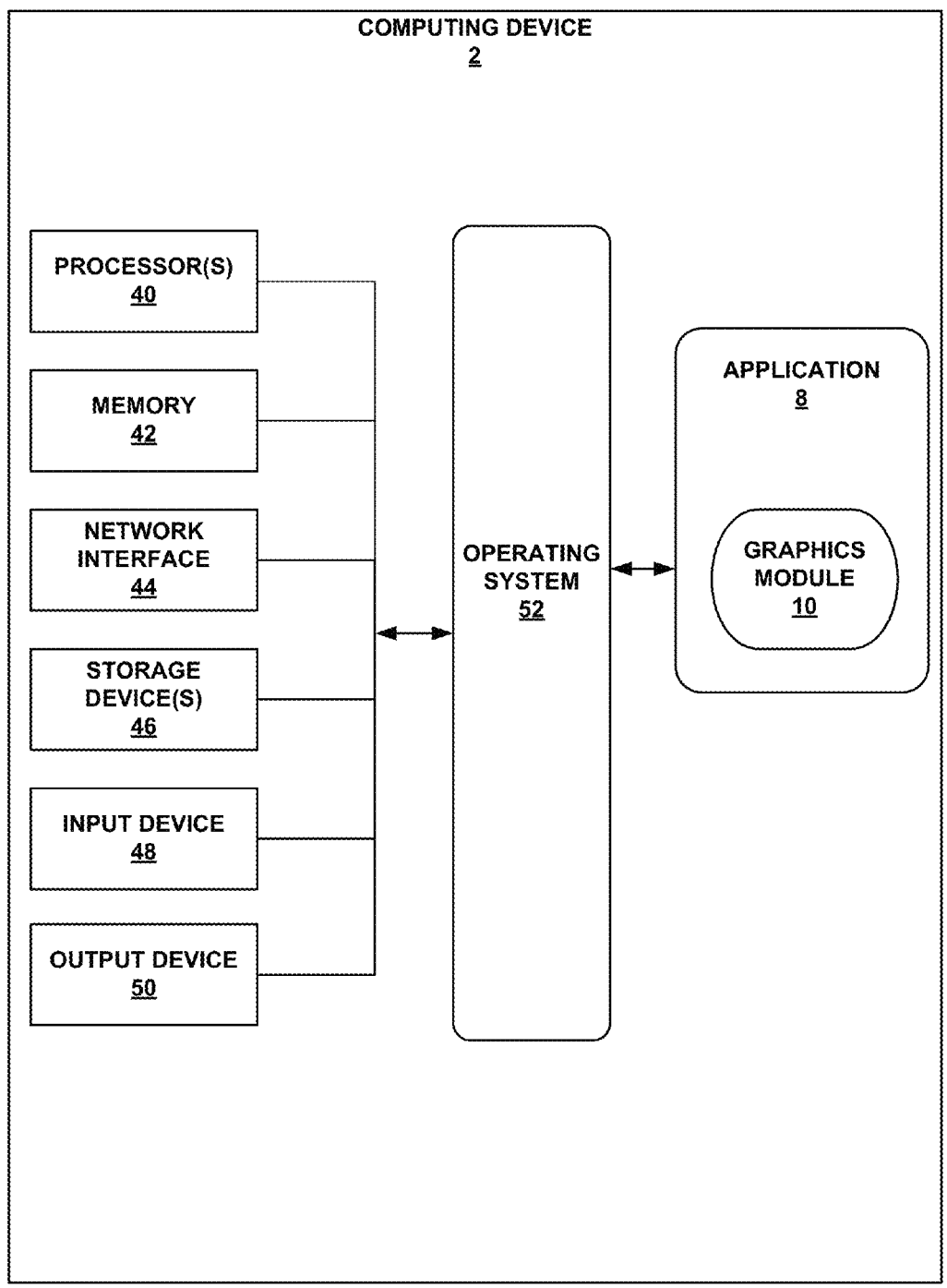
FIG. 2 is a block diagram illustrating further details of one example of the computing device shown in FIG. 1, in accordance with one or more aspects of the present disclosure.

Computing device 2 may further include one or more input devices 6, further described in FIG. 2. In some examples, an input device may be a mouse, keyboard, touch-sensitive screen or other device capable of translating a human stimulus into data comprising an input value. Such input values may be used by applications and other components of computing device 2. In this way, input device 6 enables user 16 to interact with application 8.

As shown in FIG. 1, application 8 may execute on computing device 2. Application 8 may include program instructions and/or data that are executable by computing device 2. One example of application 8 may include a program for displaying and manipulating images 14A-D in response to user input received via input device 6. For example, images 14A-14D may include graphs, photos, or other visual data. Using input device 6, user 16 may provide input values that modify data comprising images 14A-14D.

In some examples, application 8 causes GUI 12 to be displayed by output device 4. GUI 12 may include interactive and/or non-interactive graphical content that presents information of computing device 2 in human-readable form. In some examples GUI 12 enables user 16 to interact with application 6 through input device 6. For example, user 16 may use a mouse to direct a cursor displayed by output device 4 and provide one or more input values that select graphical content, e.g., a control button, displayed in GUI 12. In this way, GUI 12 enables user 16 to create, modify, and/or delete data of computing device 2.

As shown in FIG. 1, application 8 further includes graphics module 10. Graphical module 10 may provide various functions to manipulate images such as images 14A-14D. One example of image manipulation may include changing pixel values of an image based on a user selection to change a color of the image. In another example, application 8 may change pixels values of an image in response to data received a via a network connection or from other applications executing on computing device 2. In any case, graphics module 10 includes various functions to change the data of images such as images 14.

In some examples, output device 4 may display many different images 14 in GUI 12. As the number of images 14 displayed in GUI 12 increase, greater amounts of memory are used to store the increasing number of images. In one example use case, images 14A-D may each comprise a different chart that represents data from various data sets. User 16 may provide multiple user inputs to manipulate each of images 14A-14D. As user manipulates the images, pixel values in the manipulated images are changed. Such manipulation may cause computing device 2 to perform memory page swaps as each different image is manipulated. Techniques of the present disclosure may reduce such memory page swaps and further improve garbage collection thereby improving performance of computing device 2. Such techniques are described in further detail in the following figures.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 40, memory 42, a network interface 44, one or more storage devices 46, input device 48, and output device 50. Computing device 2 also includes an operating system 52. Computing device 2, in one example, further includes application 8 which may be an example of application 8 as shown in FIG. 1. Application 8 is executable by computing device 2. Each of components 40, 42, 44, 46, 48, 50 may be interconnected (physically, communicatively, and/or operatively) for inter-component communications.

Processors 40, in one example, are configured to implement functionality and/or process instructions for execution within computing device 2. For example, processors 40 may be capable of processing instructions stored in memory 42 or instructions stored on storage devices 46.

Memory 42, in one example, is configured to store information within computing device 2 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 2 (e.g., application 6 and/or one or more other applications 56) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes a network interface 44. Computing device 2, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 utilizes network interface 44 to wirelessly communicate with an external device (not shown) such as a server, mobile phone, or other networked computing device.

Computing device 2, in one example, also includes one or more input devices 48. Input device 48, in some examples, is configured to receive input from a user through tactile, audio, or video feedback. Examples of input device 48 include a touch-sensitive screen, a mouse, a keyboard, a voice responsive system, video camera, microphone or any other type of device for detecting a command from a user.

One or more output devices 50 may also be included in computing device 2. Output device 50, in some examples, is configured to provide output to a user using tactile, audio, or video stimuli. Output device 50, in one example, includes a touch-sensitive screen, sound card, a video graphics adapter card, or any other type of device for converting a signal into an appropriate form understandable to humans or machines. Additional examples of output device 50 include a speaker, a cathode ray tube (CRT) monitor, a liquid crystal display (LCD), or any other type of device that can generate intelligible output to a user.

Computing device 2 may include operating system 52. Operating system 52, in some examples, controls the operation of components of computing device 2. For example, operating system 52, in one example, facilitates the interaction of application 8 with processors 40, memory 42, network interface 44, storage device 46, input device 48, and output device 50. As shown in FIG. 2, application 8 may include graphics module 10. Graphics module 10 may each include program instructions and/or data that are executable by computing device 2. For example, graphics module 10 includes instructions that cause application 8 executing on computing device 2 to perform one or more of the operations and actions described in this disclosure. In some examples, graphics module 10 may receive input from one or more input devices 48 of computing device 2.

Any applications, e.g., application 8, implemented within or executed by computing device 2 may be implemented or contained within, operable by, executed by, and/or be operatively/communicatively coupled to components of computing device 2, e.g., processors 40, memory 42, network interface 44, storage devices 46, input device 48, and/or output device 50.

In one example, a user may provide a user input at input device 48 that causes processor 40 to load instructions of graphics module 10 into memory 42. Graphics module 10 may further cause processor 40 to load an image from storage device 46 into memory 42. The image data may be loaded by graphics module 10 into memory 42 in the form of image bitmap 70 as shown in FIG. 3.

Figure 3:
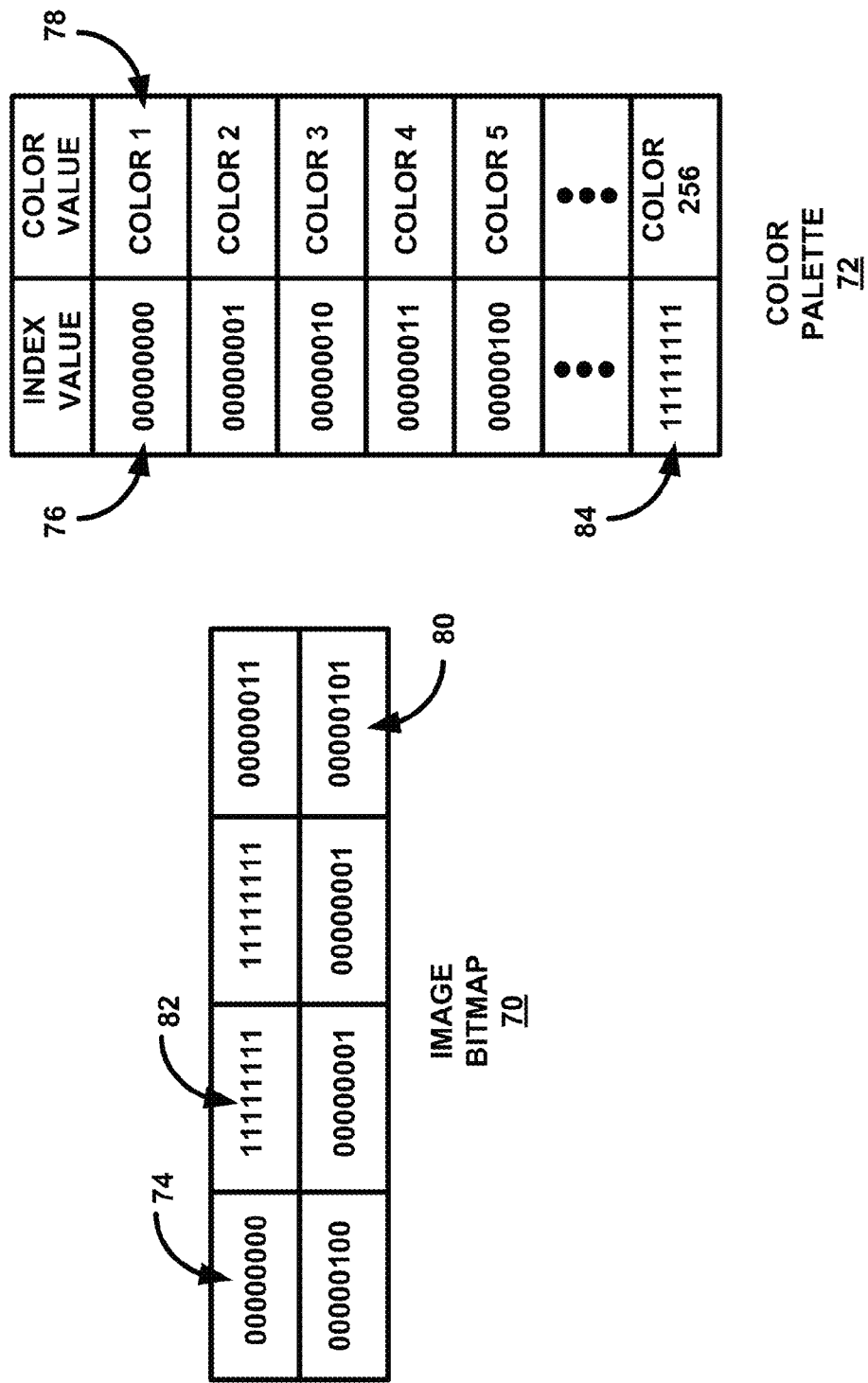
FIG. 3 is a block diagram illustrating an image bitmap that may be generated by a graphics module of FIG. 2, in accordance with one or more aspects of the present disclosure.

FIG. 3 is a block diagram illustrating an image bitmap 70 generated by graphics module 10 of FIG. 2 which may be stored in memory 42. As shown in FIG. 3, image bitmap 70 may comprise a bitmap representation of pixels in an image. Image bitmap 70 may comprise, e.g., a byte array stored in memory 42 of computing device 2. Each element of image bitmap 70 may include a storage value which may comprise a pixel value. For example, pixel value 74 may include data that represents a pixel in an image. Each pixel may be set and retrieved by x- and-y position coordinates that represent the pixel position in the image.

In FIG. 3, graphics module 10 may store pixel values in image bitmap 70 that comprise index values representing actual color values. For example, actual colors values may be represented as 32-bit values in computing device 2. To reduce memory usage when fewer colors are required in an image, graphics module 10 may use a color palette 72 to map 32-bit color values to 8-bit index values as shown in FIG. 3. Color palette 72 may be implemented as a map or other associative data structure. In this way, graphics module 10 may store an 8-bit index value as pixel value 74 in image bitmap 70 rather than a 32-bit actual color value 78.

Techniques of the present disclosure may improve the scalability and memory usage of computing device 2 by using only as much or approximately only as much memory for each pixel as is required to uniquely identify each color of color palette 72. For example, graphics module 10 may initially select an image file from storage device 46 and determine that 256 colors are included in the image. Graphics module 10 may then calculate the fewest number of bits that may be required to uniquely represent each of the 256 colors included in the image. In one example calculation, for 256 colors graphics module 10 may determine that $7 < \log_2(256) \leq 8$. Consequently, graphics module 10 may generate 8-bit index values to represent each of the actual 256 color values. The 8-bit index values may comprise a group of finite representations from 00000000-11111111. A group of finite representations represent a fixed quantity of values, e.g., color values. For instance, only 256 colors may be represented by 8-bit indexes and a 9-bit index value would therefore not be included in a group of 8-bit finite representations.

By using the actual quantity of color values in the calculation, e.g., the size of the color palette, graphics module 10 may dynamically calculate a fewest number of bits required to uniquely identify each of the storage values, e.g., actual colors, stored in image bitmap 70. Furthermore, graphics module 10 may generate a group of finite representations with the fewest number of bits required to represent each of the color values. In this way, techniques of the present disclosure may improve memory use efficiency and system performance while reducing programmer effort.

Figure 4:
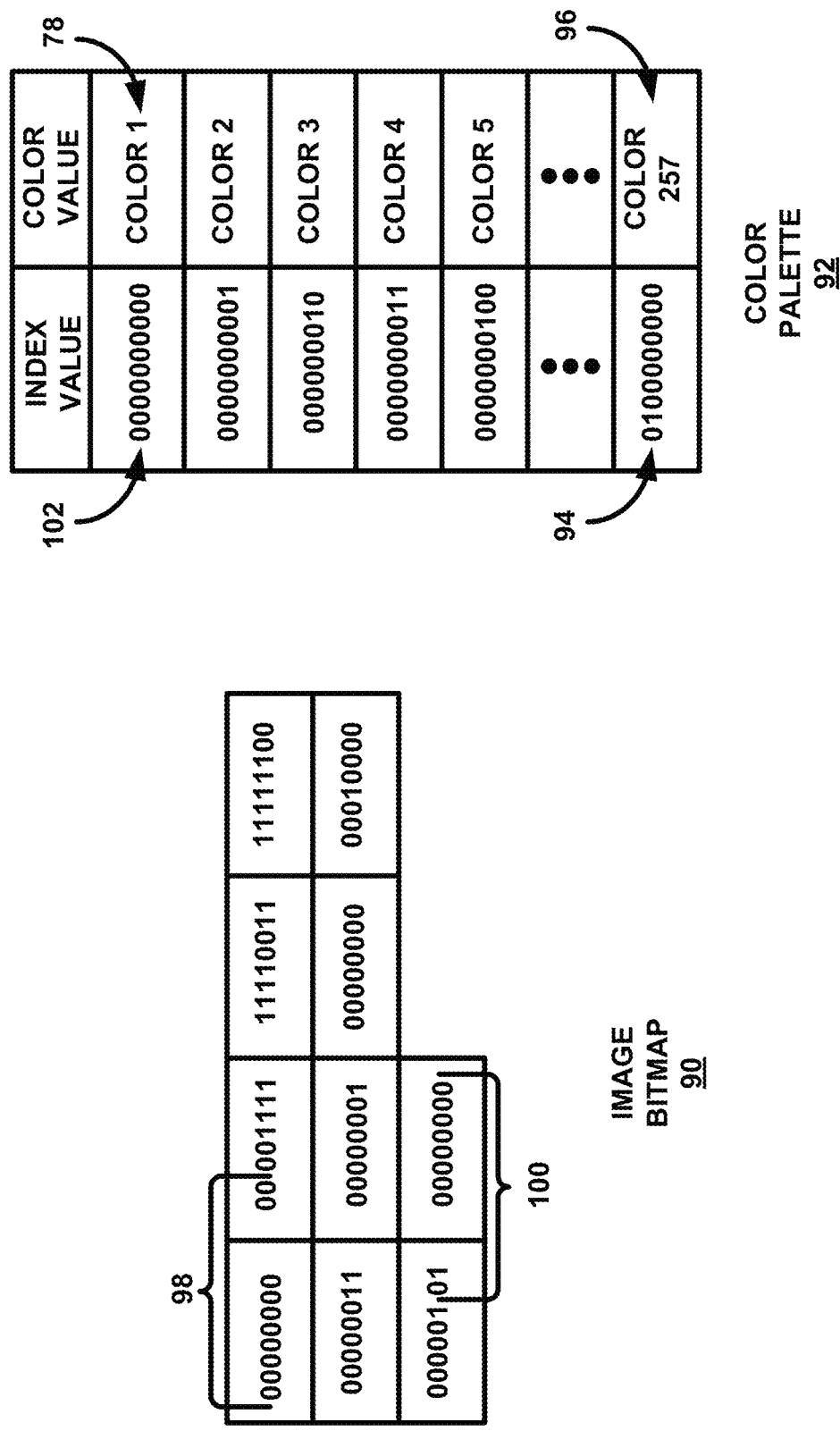
FIG. 4 is a block diagram illustrating an image bitmap that may be generated by a graphics module of FIG. 2, in accordance with one or more aspects of the present disclosure.

FIG. 4 is a block diagram illustrating an image bitmap 90 generated by graphics module 10 of FIG. 2, which may be stored in memory 42. As described in FIG. 4, techniques of the present disclosure further enable graphics module 10 to granularly increase and decrease (e.g., increase or decrease in minimal increments, or a least nearly minimal) the size of the index values as more colors are added to color palette 72 while image bitmap 70 is manipulated in memory 42. Techniques disclosed herein provide for granular modification of the size of index values. Such granular modification enables graphics module 10 to store pixel values contiguously in image bitmap 70 while reducing the amount of memory required to store each pixel value. Moreover the individual pixel values in memory may be dynamically re-allocated as more colors are added to the image.

Techniques of the present disclosure may be provided transparently via an Application Programming Interface (API) for fast and efficient manipulation of the image while reducing programmer effort by hiding the implementation of the example techniques. For example, an API may accept and return 32-bit color values but may implement the image bitmap using techniques described herein to dynamical reallocate memory for the image bitmap as colors are added and removed In this way, underlying complexity of techniques of the present disclosure may be hidden by the graphics library from the programmer or other user.

In one example technique illustrated in FIGS. 3 and 4, the number of colors in image bitmap 70 may increase from 256, as shown in FIG. 3, to 257 colors as shown in FIG. 4. For instance, an additional color may be added to the image represented by image bitmap 70 as the image is being manipulated in memory by graphics module 10. Initially, graphics module 10 may receive a request to store an input value, e.g., the 257th color, in image bitmap 70. The request may further specify the 257th color will replace pixel value 80 of image bitmap 70. The 257th color may be color value 96 as shown in color palette 92 of FIG. 4. Upon receiving the request to store the 257th color, graphics module 10 may determine that the 257th color is not represented by an index value in color palette 72.

In response to determining the 257th color is not represented in color palette 72, graphics module 10 may generate an index value that represents the 257th color. In some examples, graphics module 10 may use the number of colors, e.g., 257, to calculate the fewest number of bits required to represent each of the 257 colors. To calculate the fewest number of bits, for 257 colors graphics module 10 may perform a calculation to determine $8 < \log_2(257) \leq 9$. Consequently, graphics module 10 may generate 9-bit index values to represent each of the 257 colors. Each of the 9-bit index values may be mapped to color values in color palette 72, e.g., color value 257 may be mapped to 100000000 (or 0100000000).

In some examples, graphics module 10 may increase the number of bits for each index value by more than 1 bit. For instance, graphics module 10 may determine that 9-bits comprise the fewest number of bits to represent 257 colors; however, graphics modules 10 may increase the number of bits for each index value by 2 bits as shown in FIG. 4. By increasing the number of bits by 2, graphics module 10 may reduce the number of times memory is reallocated when additional colors are added to image bitmap 90 and colors values are remapped to index values with greater numbers of bits.

In some examples, graphics module 10 may determine, upon generating an index value, that the number of bits required to represent an additional color is less than or equal to the current size of index values stored in color palette 72. For instance, if only 255 colors are presently stored in color palette 72, a 256th color may be added to color palette 72 and mapped to an 8-bit index that is not presently mapped to another color value. For example, the 256th color value may be mapped to color palette 72 index value 84 and the index value may be stored in image bitmap 70 as pixel value 82.

Returning to the current example of replacing pixel value 80 with an index value representing a 257th color, graphics module 10 may determine the generated 10-bit index value, e.g., 0100000000, corresponding to the 257th color is not included in the finite group of 8-bit representations that comprise the index values of color palette 72. Consequently, upon determining the 10-bit index value is not included in the finite group of 8-bit index values, graphics module 10 may increase the size of each index value by two bits as shown in FIG. 4. To accommodate the increase in size of each index value, computing device 2 may modify a storage capacity of the data structure, e.g., bitmap 70, to store the 10-bit index values. In one example, a storage capacity of the data structure may refer to a number of bits the data structure is capable of representing. In other examples, a storage capacity of the data structure may refer to a number of index values the data structure is capable of representing. In any case, graphics module 10 may dynamically modify the storage capacity of bitmap 70 in order to store the increased number of bits generated by increasing index values from a size of 8 bits to a size of 10 bits.

As shown in FIG. 4, color palette 92 includes each color value of color palette 72 as shown in FIG. 3 and additionally a color value 96 that comprises the 257th color. Each color value in FIG. 4 is re-mapped by graphics module 10 to a 10-bit index value that corresponds to the 8-bit index values of color palette 72. More specifically, each color value of color palette 72 may be re-mapped to an index value in color palette 92 that is generated from the index value of color palette 72 associated with the color value. For example, color value 78 is represented by index value 76 as shown in FIG. 3. Graphics module 10 may select index value 76 associated with color value 78. As shown in FIG. 4, graphics module 10 generates a mapping that maps color value 78 to index value 102. Index value 102 may be a 10-bit representation generated by graphics module 10 based on index value 76 of color palette 72. Finally, color value 96 that represents index value 94 is further associated with index value 94 in color palette 92.

Upon re-mapping each color value to a corresponding 10-bit index value, graphics module 10 may dynamically allocate additional memory to store the 10-bit values. In some examples, graphics module 10, determines the amount of memory required based on the size of each index value and the number of index values stored in the image bitmap. For example, as shown in FIG. 3, image bitmap 70 includes eight pixel values represented by index values. Consequently, graphics module 10, when generating image bitmap 90, may allocate two additional bytes of memory for image bitmap 90 to accommodate the 10-bit index values that represent each pixel. For instance, eight pixel values that increase by two bits each require two additional bytes of memory in image bitmap 90.

After memory has been allocated and image bitmap 90 has been generated, graphics module 10 may store the eight 10-bit pixel values in image bitmap 90. For example, pixel value 98 of FIG. 4 that corresponds to index value 76 in FIG. 3, may be stored in the first 10 bits of bitmap 90. Similarly, graphics module 10 may store the next 10-bit index value that corresponds to pixel value 82 of FIG. 3, in the 10-bits following pixel value 98. Thus, graphics module 10 stores the 10-bit index values in image bitmap 90 in the same order as image bitmap 70. In this way, colors of the image remain the same although the size of each pixel value has increased from 8 bits to 10 bits. After the index values have been stored in image bitmap 90, graphics module 10 may set pixel value 100 to index value 94 that represents color value 96, e.g., the 257th color.

As shown in the examples of FIGS. 3-4, graphics module 10 may dynamically increase the size of index values to accommodate additional color values in color palette 92 and, in some examples, use only as much or approximately only as much memory is as is required to store the index values. Consequently, the memory footprint of the image bitmap may grow as needed while maintaining fast and efficient manipulation of the image bitmap in memory 42. Techniques to grow the image bitmap as shown in FIGS. 3-4 may be performed in reverse order to shrink image bitmap 90 as fewer colors are included in the image. In some examples, memory may be de-allocated as image bitmap 90 is shrunk. In this way, graphics module 10 may shrink the image bitmap as colors are removed from the image.

In some examples, graphics module 10 may switch from index mode as described in FIGS. 2-4 to direct mode. In direct mode, graphics module 10 may store color values directly in image bitmap 90. In one example, graphics module 10 may initially generate image bitmap 90 as a byte array and operate in index mode. As more colors are added to the image, graphics module 10 may generate index values that include greater numbers of bits to uniquely represent newly added colors. In some examples, graphics module 10 may include a threshold that, when satisfied, causes graphics module 10 to switch from index mode to direct mode. A threshold may be user-specified or comprise a computer-generated value. For example, the threshold may specify a number of bits of an index value or a number of color values in a color palette. In one example, if graphics module 10, when increasing the size of index values, e.g., because a new color has been added to color palette 90, determines that a number of color values in a color palette satisfies the threshold, graphics module 10 may switch from index mode to direct mode. In one example, graphics module 10 may determine the threshold is satisfied when the number of colors in a color palette is greater than the threshold. When switching from index mode to direct mode, graphics module 10 may replace each pixel value comprising and index value in image bitmap 90 with its corresponding color value of color palette 92. In some examples, graphics module 10 may generate 32 bit values for each color value and may further reallocate additional memory to store each 32-bit value as described in FIGS. 2-4.

In some examples, graphics module 10 may, when initially generating an image bitmap determine whether to operate in index or direct mode. For example, graphics module 10 may receive data that specifies an initial size of the image bitmap. In one example, such data may include a total number of rows and a total number of columns of the bitmap. Multiplying the number of rows and columns provides the total number of pixels in the bitmap. Graphics module 10 may further compare the size of the image bitmap to a threshold that, when satisfied, causes graphics module 10 to operate in direct mode initially instead of index mode. A threshold may be user-specified or comprise a computer-generated value. In one example, graphics module 10 may determine the threshold is satisfied when the number of bits initially satisfied for the image bitmap is greater than a threshold. In such an example, graphics module 10 may operate in direct mode initially instead of index mode. Therefore, graphics module 10 may store color values directly in the image bitmap.

Figure 5:
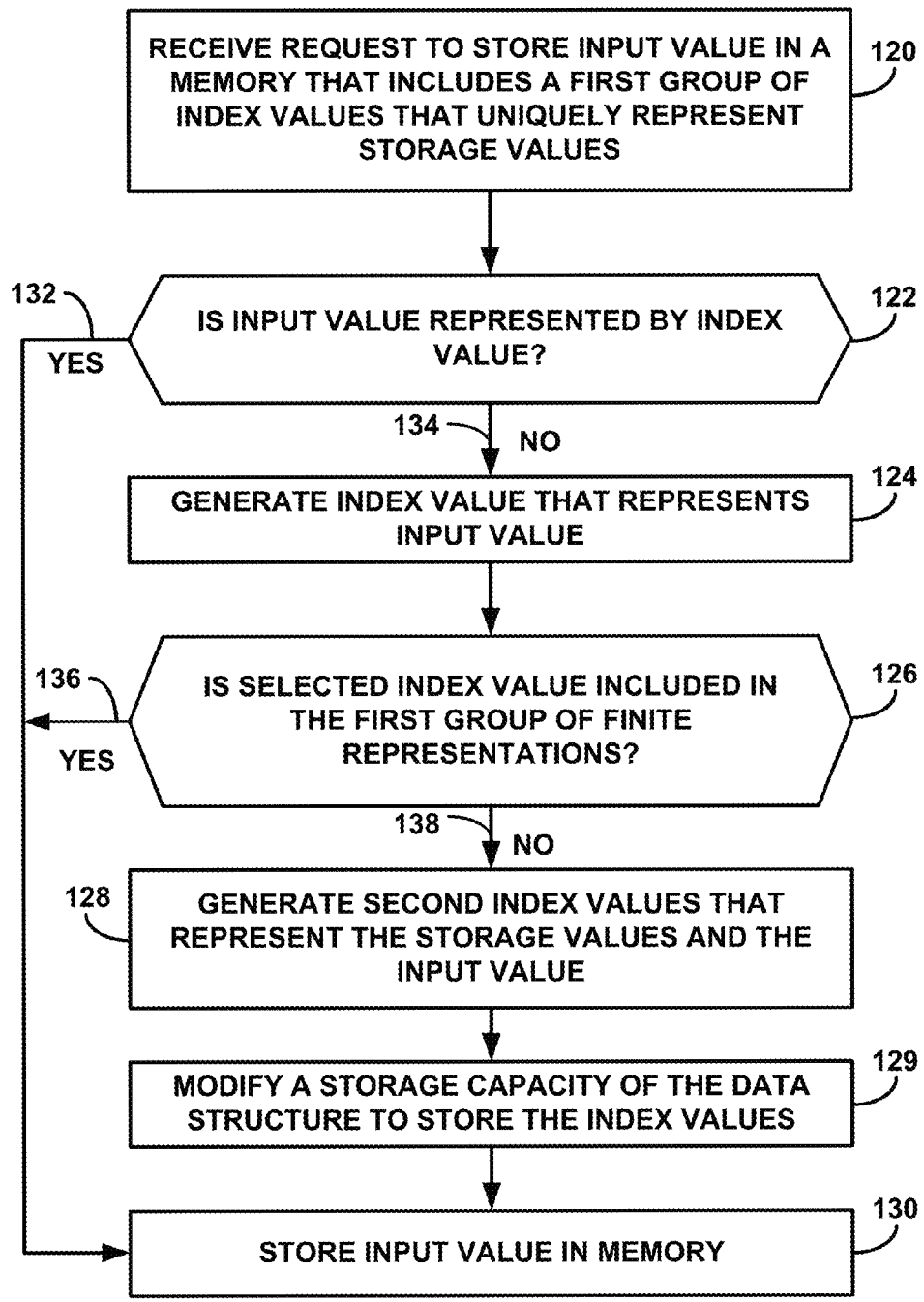
FIG. 5 is a flow chart illustrating an example method to dynamically increase the size of the index values, in accordance with one or more aspects of the present disclosure.

FIG. 5 is a flow chart illustrating an example method to dynamically increase the size of the index values, in accordance with one or more aspects of the present disclosure. For example, the method illustrated in FIG. 5 may be performed by computing device 2 shown in FIGS. 1 and/or 2. The example method of FIG. 5 will be described in accordance with FIGS. 1-4.

As shown in FIG. 1, graphics module 10 may receive a request to store an input value in a memory, wherein the memory stores a first group of index values that uniquely represent storage values, wherein the index values comprise a first group of finite representations of the storage values (120). In some examples, the input value may comprise a color value. Each color value may comprise a storage value in a color palette, e.g., color palette 92 of FIG. 4. The request may further include x-axis and y-axis position coordinates that together comprise a position of a pixel value within an image bitmap. Thus, the request may include one or more instructions and data including a color value and position coordinates to set a pixel value at the specified position coordinates to the specified color value.

Upon receiving the request, graphics module 10 may determine whether the color value is represented by an index value in color palette 72 (122). If the color value is represented by an index value (132), graphics module 10 may store the color value at the position coordinates specified in the request (130). If the color value is not represented by an index value (134), graphics module 10 may generate an index value that represents the color value (124). In some examples, graphics module 10 may determine whether the generated index value is included in the first group of finite representations, e.g., index values in color palette 72 (126). For instance, one or more 8-bit representations may not presently be assigned as index values to color values in color palette 72. In such examples, graphics module 10 may generate an 8-bit index value that is not presently assigned to a color value in color palette 72. Because the generated index value is 8-bits, graphics module 10 may determine the generated index value is included in the finite group of 8-bit representations (136). Consequently, graphics module 10 may assign the generated index value to the color value received in the request (130).

In some examples, each 8-bit index value in color palette 72 may already represent a color value. Because the number of 8-bit index values are finite, graphics module 10 may generate, e.g., a 10-bit index value as described in FIGS. 3 and 4 (124). Graphics module 10 may further determine if the 10-bit index value is included in the finite group of 8-bit representations (126). Since the 10-bit index value is not already included in the finite group of 8-bit representations (138), graphics module 10 may generate a second group of 10-bit index values that include a second group of finite representations that uniquely represent all the storage values, e.g., existing color values of color palette 72, and the input value, e.g., the color value received in the request (128). Graphics module 10 may further modify the storage capacity of the image bitmap in order to store 10-bit index values. For example, graphics module 10 may increase the size of the bitmap to store the larger 10-bit index values and accommodate the 2-bit increase in size of each index value. In some examples, graphics module 10 may allocate additional memory for the image bitmap in order to increase the storage capacity of the image bitmap. Using techniques described in FIGS. 3 and 4, graphics module 10 may map each existing color value in color palette 72 to a 10-bit index value as shown in color palette 92 of FIG. 4. Each 10-bit index value of color palette 92 may correspond to an 8-bit color index of color palette 72. In this way, graphics module 10 may dynamically increase the number of colors that may be represented in an image bitmap and granularly increase the number of bits of the index values to improve storage efficiency of pixel values in the image bitmap.

Although techniques of the present disclosure have been described using an example of pixel values stored in an image bitmap, the techniques may be applicable, more generally, to any type of index-based data structure, e.g., array, where the required size of the index values is not initially known at the time of allocation, or changes frequently, and where the access and manipulation of the index values may require efficient performance.

For instance, an example may include an ordered list of unique identifiers that represent a queue of customers. The unique identifiers may comprise index values that link to customer records stored in a database. If the queue is manipulated often, such as a prioritized queue, then the operations on the queue may require efficient performance, and could be implemented using an array of identifiers. If new customers are added and removed from the system on a frequent basis, the number of possible identifiers may not be known. Growing and shrinking the number of bits of the identifiers and the size of the queue using techniques of the present disclosure may allow the queue to use less memory when the number of identifiers are few, and still grow to accommodate increases in the number of identifiers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the disclosure. The embodiment was chosen and described in order to best explain the principles of the invention and the practical application, and to enable others of ordinary skill in the art to understand the invention for various embodiments with various modifications as are suited to the particular use contemplated.

Various embodiments of the disclosure have been described. These and other embodiments are within the scope of the following claims.

In some examples, techniques of the present disclosure that set a pixel value may be implemented using the following pseudocode. Although the following pseudocode does not further include memory allocation logic to modify the size of the image bitmap, such logic may be implemented according to the preceding description.

```
// Set color value at x,y position in image bitmap
setPixel(x,y,color value) {
    if (directMode){
        add color value to bitmap;
    }else {
        get index value from color palette associated with color value;
        if (index value associated with color value exists){
            // Calculate position in the bitmap that corresponds to x,y
            // coordinates of pixel value
            position = positionInBitmap(x,y);
            // set pixel color at the specified position
            setPixelColor(position, color);
        }else {
            determine number of index values mapped to color values
            if (unmapped index value available) {
                map available index value to color value in color
                    palette;
                set index value in image bitmap at x,y position;
            }else {
                if (limit reached of number of colors for index mode) {
                    directMode = true;
                    add color value to bitmap;
                }
                else {
                    // E.g., no 8-bit index values available to represent
                    // index value so generate 10-bit index value for new
                    // color value and re-map existing 8-bit index values to
                    // 10-bit index values
                    generate new index value for color value;
                    map new index value to new color value in
                        color palette;
                    re-map each existing index value of the color
                        palette to new index values;
                    allocate additional memory in image bitmap for
                        larger index values;
                    update pixel values of the image bitmap;
                }
            }
        }
    }
}
//Setter for the pixel color value
setPixelColor(position, color) {
    int bitStartIndex = position * pixelSize
    int bitEndIndex = bitStartIndex + pixelSize − 1
    int byteStartIndexInArray = floor(bitStartIndex / 8)
```

-continued

```
int byteEndIndexInArray = floor(bitEndIndex / 8)
bitStartIndex = bitStartIndex % 8 //Where % is the modulus operator
bitEndIndex = bitEndIndex % 8
if (byteStartIndexInArray == byteEndIndexInArray) {
    setBitsinByte( byteStartIndexInArray, color, bitStartIndex ,
        bitEndIndex )
} else {
    setBitsinByte( byteStartIndexInArray, color, bitStartIndex , 7 )
    color = unshiftBits(color, (8 - bitStartIndex))
    setBitsinByte( byteEndIndexInArray, color, 0 , bitEndIndex )
}
}
//Helper method to create a bit mask
bitarray createMask (startbit, endbit) {
    bitarray mask = [0,0,0,0,0,0,0,0]
    from (startbit to endbit) {
        mask[currentbit] = 1
    }
    return mask
}
//Helper method to set the bits in a byte
setBitsinByte(byteIndex, color, startbit, endbit) {
    var mask = createMask( startbit, endbit)
    color = shiftBits(color, startbit)
    imagePixels[byteIndex] = bitwiseOr(
        bitwiseAnd (imagePixels[byteIndex],
        bitCompliment(mask) ), color)
}
```

Techniques are further disclosed using the following and foregoing pseudocode to retrieve a pixel value.

```
// Get pixel value at a specified position coordinate
getPixel(x,y) {
    if(direct mode) {
        return color value from the bitmap using x,y coordinates;
    }else {
        // Calculate position in the bitmap that corresponds to x,y
        // coordinates of pixel value
        position = positionInBitmap(x,y);
        index value = getPixelColor(position);
        return color from the color array associated with the index value;
    }
}
//Getter for the pixel color value
int getPixelColor(position) {
    int bitStartIndex = position * pixelSize
    int bitEndIndex = bitStartIndex + pixelSize - 1
    int byteStartIndexInArray = floor(bitStartIndex / 8)
    int byteEndIndexInArray = floor(bitEndIndex / 8)
    bitStartIndex = bitStartIndex % 8 //Where % is the modulus operator
    bitEndIndex = bitEndIndex % 8
    if (byteStartIndexInArray == byteEndIndexInArray) {
        return getBitsFromByte( imagePixels[byteStartIndexInArray] ,
            bitStartIndex , bitEndIndex )
    } else {
        return (getBitsFromByte( imagePixels[byteStartIndexInArray] ,
            bitStartIndex , 7) + shiftBits(getBitsFromByte(
            imagePixels[byteEndIndexInArray] , 0, bitEndIndex ), (8 -
            bitStartIndex)))
    }
}
```

The invention claimed is:

1. A method comprising:
receiving, by a computing device, a request to store an input value in a data structure, wherein the data structure stores one or more index values of a first group of index values, wherein the first group of index values uniquely represent storage values, wherein the one or more index values comprise a first group of representations of the storage values;
determining, by the computing device, that the input value is not represented by an existing index value of the first group of index values;
generating, by the computing device, an index value that represents the input value;
determining, by the computing device, that the generated index value is not included in the first group of representations;
responsive to determining that the generated index value is not included in the first group of representations, generating, by the computing device, a second group of index values comprising a second group of representations that uniquely represent all of the storage values and the input value, wherein a first size of index values of the first group is different than a second size of index values of the second group;
modifying, by the computing device, a storage capacity of the data structure to store the index values of the second group of the second size; and
storing, by the computing device, the second group of index values in the data structure.

2. The method of claim 1, wherein determining that the generated index value is not included in the first group of representations further comprises:
determining, by the computing device, that a first size of each representation of the first group of representations comprises a first number of bits;
determining, by the computing device, that a second size of the generated index value comprises a second number of a bits; and
determining, by the computing device, that the first number of bits is not equal to the second number of bits.

3. The method of claim 1, wherein determining that the input value is not represented by an index value of the first group of index values further comprises:
querying, by the computing device, a group of associations between the first group of index values and the storage values, wherein each index value of the first group of index values uniquely represents a storage value of the storage values; and
responsive to querying the group of associations, determining, by the computing device, that the group of associations do not include an association between the input value and the index value of the first group of index values.

4. The method of claim 1, wherein generating the second group of index values further comprises:
determining, by the computing device, a fewest number of bits of each index value of the second group of index values to uniquely represent all the storage values and the input value; and
wherein each generated index value of the second group of index values has no more bits than the fewest number of bits.

5. The method of claim 1, further comprising:
receiving, by the computing device, data that specifies an initial size of the data structure required to store the one or more index values of a first group of index values;
determining, by the computing device, the an initial size of the memory required to store the one or more index values satisfies a threshold value; and
storing, by the computing device, the input value in the data structure.

6. The method of claim 1, further comprising:
receiving, by the computing device, a request to store a second input value in the data structure,
determining, by the computing device, a number of index values of the first group of index values satisfies a threshold value; and storing, by the computing device, the input value in the data structure.

7. The method of claim 1 further comprising:
selecting, by the computing device, a first index value of the first group of index values associated with a storage value of the storage values; and
generating, by the computing device, an mapping between the storage value associated with the first index value and a second index value of the second group of index values, wherein the second index value is generated based on the first index value.

8. The method of claim 1, wherein the first group of representations of the storage values comprises a first group of representations of the storage values, wherein the first group of representations comprise a fixed quantity of representations.

9. The method of claim 1, wherein the second group of index values are stored contiguously in the data structure.

* * * * *